United States Patent Office 2,823,289
Patented Feb. 11, 1958

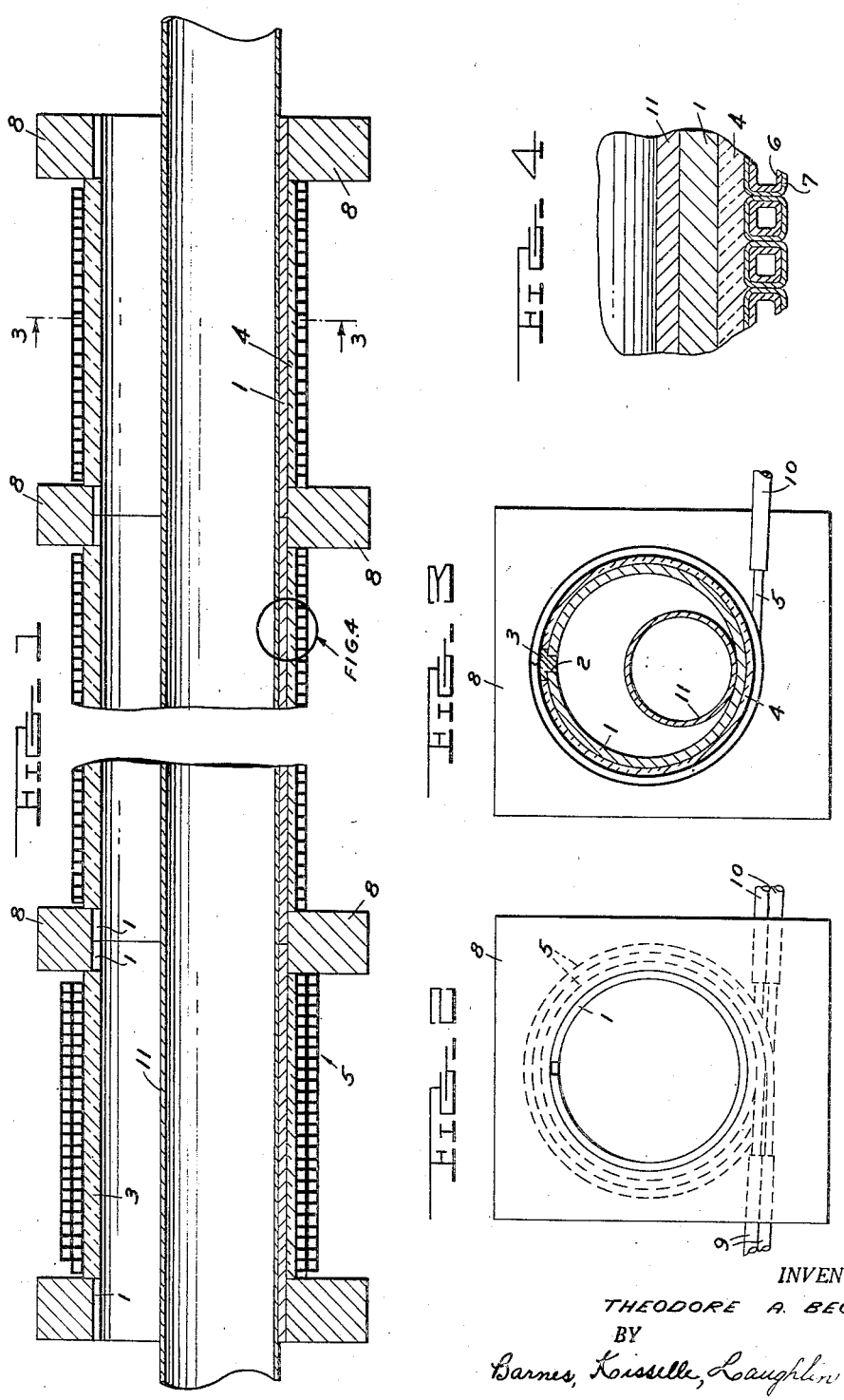

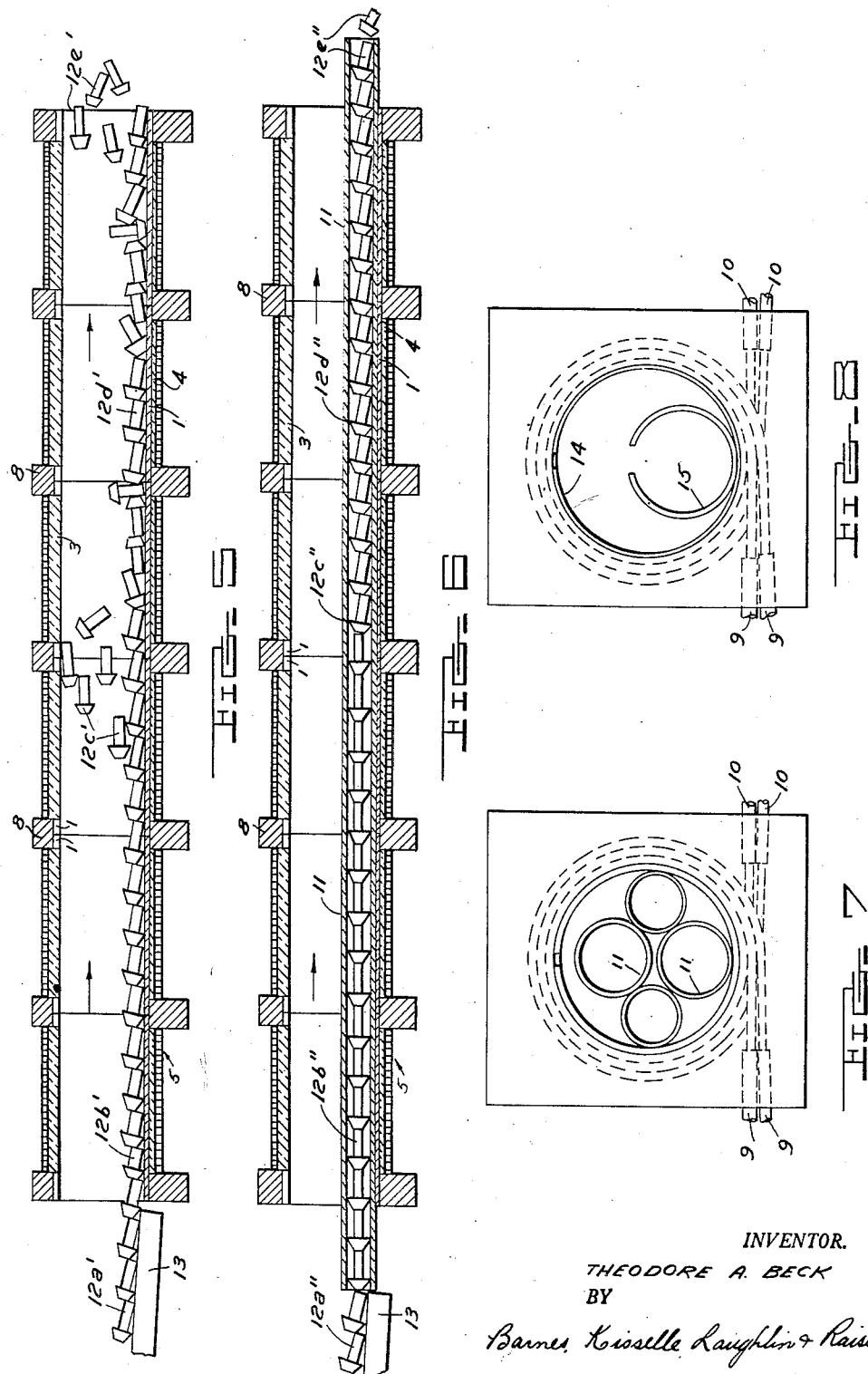

2,823,289

INDUCTION HEATING METHOD AND APPARATUS

Theodore A. Beck, Salem, Ohio, assignor, by mesne assignments, to American Radiator & Standard Sanitary Corporation, New York, N. Y., a corporation of Delaware Application February 14, 1955, Serial No. 487,940

20 Claims. (Cl. 219—10.41)

This invention relates to induction heating and more particularly to improvements in induction heating methods and apparatus utilizing a source of low frequency, alternating current electrical energy for purposes such as the annealing or heat treating of metallic objects. More specifically, this invention advocates the placing of a sleeve or object-guiding insert within the liner of a helically wound electrical solenoid in a manner which will result in increased operating efficiency of the unit and increased ease in moving or processing metallic objects therethrough.

Heretofore both high frequency and low frequency induction heating units have been extensively used in industry but there is a growing preference for the latter type of unit if it can be adapted to produce the required results. This preference grows primarily from the fact that special energy form converters such as motor generators, spark-gap oscillators, mercury-arc converters, or vacuum tube oscillators are not needed. With low frequency induction heating equipment any form of commercially available electrical energy, for instance, sixty cycle alternating current, can be advantageously utilized without having to install various components of the costly and complex equipment previously referred to.

Metallic objects located within the magnetic field of an induction heating coil undergo a temperature rise; in the case of magnetic materials the temperature rise is caused by both hysterisis losses and eddy current losses within the workpiece but in the case of non-magnetic metals it is caused by eddy current losses only. This transformation of electrical energy into heat tends, by nature, to be most intense at and immediately below the exterior surface of the workpiece being processed—the degree of intensity of transformation with respect to depth below the surface being a function of the frequency of the directionally alternating magnetic field. As the alternating frequency of the magnetic field increases a greater portion of the transformation occurs immediately adjacent the surface and although lower frequencies cause greater initial or instantaneous penetration such is accomplished wtih a loss in overall efficiency of the unit.

Also, it is well known that the operating efficiency of an induction heating coil is proportional to the ratio of the diameter or cross-sectional area of the object being heated to the internal diameter or cross-sectional area of the induction heating coil. With a given induction heating unit the operating efficiency drops as the cross-sectional area of the parts being heated is reduced in relation to the interior cross-sectional area of the coil. Because of this characteristic of induction heating coils it is a common practice to design, manufacture, and install separate units for different types and sizes of workpieces in order to obtain efficient and economical heating by induction methods. This, in most cases, is costly from th standpoint of equipment and space requirements.

I have discovered that the above deficiencies of induction heating units can be overcome and that a single induction heating coil of fixed dimensions can be made to efficiently heat any number of metallic objects having a diameter or cross-sectional area appreciably or even substantially smaller than the largest object which can be processed through the unit. For instance, I have discovered that objects such as rivets or bolts of three-fourths inch diameter or smaller can be efficiently heated to high temperatures in an induction heating coil having a six inch internal diameter.

The increased operating efficiency is brought about by placing within the induction heating coil a sleeve or object-guiding insert of readily predetermined composition, shape, and proportion; exact details of how I select and size the proper insert will be fully described later.

Additionally, I have discovered that use of an object-guiding insert within an induction heating coil materially increases the ease with which the metallic objects being heated therein can be moved through the induction heating unit. In induction heating installations it is known that small workpieces of magnetic composition being passed through the coil tend to gather and cling at the internal surface of the coil or its base liner. If my object-guiding insert is used such workpieces tend to "float" within the insert. In the type of induction heating installation where the metallic objects are caused to move through the coil by magnetic and gravitational forces alone, the addition of an object-guiding insert materially increases the ease with which said parts can be moved through the coil.

Also, my invention greatly enhances the versatility of existing induction heating coils; likewise my invention increases the usefulness of new induction heating coils which normally would be intended for use in the processing of metallic objects having substantially identical cross-sectional areas. With the adoption of my invention it becomes necessary to design and fabricate only a single size induction coil for utilization in the processing of parts of several different sizes. Hence, the economical advantages of this invention are readily seen.

From the above it is observed that an object of my invention is to provide an improved method and apparatus for induction heating capable of producing greater operating efficiencies than heretofore known.

Another object of my invention is to provide induction heating units which will facilitate and simplify the processing or movement of workpieces therethrough.

Also, another object of my invention is to enhance the versatility of both new and existing induction heating units.

Another object of my invention is to provide a method and apparatus for induction heating which will tend to minimize or eliminate the scaling or oxidation of objects being processed through the unit.

Additionally, a further object of my invention is to provide an improved induction heating unit which is of simple construction and which may be built at a minimum of expense.

Other objects and features will become apparent with greater study of my invention, particularly when reference is made to the drawings and description wherein:

Fig. 1 is a longitudinal sectional view of a typical induction heating coil embodying my invention.

Fig. 2 is an end view of Fig. 1.

Fig. 3 is a sectional view taken along line 3—3 of Fig. 1.

Fig. 4 is a fragmentary sectional view of the induction heating coil of Fig. 1 on a greatly enlarged scale.

Fig. 5 is a longitudinal sectional view of a typical induction heating unit showing the processing of magnetic metallic objects therethrough without the benefit of my invention.

Fig. 6 is a sectional view similar to Fig. 5, but showing a typical unit embodying my invention and showing the improved processing of the magnetic metallic objects therethrough.

Fig. 7 is an end view of a typical induction heating unit embodying a modification of my invention; and Fig. 8 is an end view similar to Fig. 7, but showing still another modification of my invention.

An induction heating coil of typical construction is illustrated in Fig. 1. As shown, the unit is comprised of several sub-coil assemblies each sub-coil assembly being fabricated upon a base sleeve 1 which normally is of a metallic material. To prevent circuitous currents within the base sleeve a longitudinal gap 2 is provided but because a structurally rigid base member is required the longitudinal gap is supplemented with a joint member 3 which is usually formed of a ceramic material. As shown in Fig. 3 joint member 3 has a T-shaped cross-sectional area. Other cross-sectional shapes such as the H-shape can also be used.

A layer of insulating material 4 such as asbestos or mica is interposed between base sleeve 1 and the helically wound electrical conductor unit 5. This layer of insulation must be made sufficiently thick to prevent overheating of conductor unit 5 by heat conducted from the interior of the induction heating unit during its operation.

Another type of structural base construction (not illustrated in the accompanying drawings) utilizes a comparatively thick tubular member having circumferential continuity and made of a ceramic or other refractory material. Experience generally indicates that the ceramic liner is not as practical as is the longitudinally split metallic sleeve.

Fig. 4 shows the helically wound electrical conductor unit 5 in greater detail. The conductor unit 5 includes copper conductor 6, as shown, having a hollow rectangular-shaped cross-section and wrapped with a glass insulating tape 7 to prevent transverse movement of the electrical current carried by the conductor. Other methods or materials can be used to wrap or cover the conductor and likewise the copper conductor 6 may have alternative cross-sectional shapes. A hollow circular cross-sectional shape is frequently used and in some instances the conductor may be of solid rather than hollow construction if there is no need to circulate cooling water therethrough. Also, the conductor is wound in a close helical manner and assists in retaining insulating material 4 in place.

As illustrated in Fig. 1 more than one layer of electrical conductor 6 may be placed on any particular sub-coil assembly. This is done to produce a magnetic field of greater intensity at pre-selected locations within the unit. Generally the multi-layer sub-coil assemblies are located at or adjacent to the entrance end of the induction heating unit. Three or even four layers of conductor 6 can be fabricated although it is well known that each succeeding layer of conductor causes less increase in the magnetic field intensity than does the preceding conductor layer.

When the composite unit is assembled spacer members 8 made of a fibrous or other dielectric material, are used to support the ends of the sub-coil assemblies. The conductor or conductors 6 of each sub-assembly are connected to a source of cooling water through flexible connection 9 which preferably is a section of rubber hose. A similar connection 10 is made from the discharge end of the conductor to a drain or other water removal means.

Additionally, electrical conductors 6 are connected to a source of electrical energy such as a low frequency alternating current energy. The sub-assembly conductors may be connected to the source either in parallel or in series depending upon the specific operating conditions to be met. Not shown are means for making electrical connections to the coils and switch gear, capacitors, cooling water flow regulators, or other items of auxiliary equipment normally associated with induction heating units. Such accessories are well known to persons skilled in the art.

Object-guiding insert 11 is placed within the base liner 1 of the induction heating unit. Insert 11 must be of metallic composition and preferably is non-magnetic; materials such as copper, non-magnetic stainless steels, or a nickel-chromium alloy such as "Inconel" give satisfactory results. When designing and specifying an object-guiding insert I find that several matters must be kept in mind.

First, the internal diameter or cross-sectional configuration of insert 11 should be substantially similar to the outside diameter or cross-sectional conguration of the metallic object to be processed therethrough. However, the interior of the insert must be sufficiently large enough to permit passing of the workpieces therethrough without binding. Without making proper allowances for thermal expansion of the workpiece during the heating cycle the unit would become inoperative.

Secondly, the wall thickness of insert 11 should be kept at a minimum. The performance data given below indicates that greater operating efficiency results when the thickness of insert 11 is reduced but that total absence of an insert greatly reduces that efficiency. Hence, the thickness should ideally be just sufficient to give the insert the strength and rigidity necessary to support the loading caused by the presence of the workpieces contained therein. If insert 11 were supported at each end rather than in the manner illustrated in Fig. 1 the wall thickness must necessarily be slightly greater depending upon the length of insert 11, its diameter, and the weight of the metallic objects located therein.

As a specific example, I have found that in an induction heating coil without an insert and having a longitudinally split base liner 1 of 5½ inches diameter and 60 inches length, 940 pounds per hour of low carbon steel objects, having a 3½ inch outside diameter, can be heated to a temperature of 1300 degrees Fahrenheit with an energy input of 108 kilowatt hours.

If, according to the invention, a solid tubular insert 11, made of nickel-chromium alloy such as Inconel and having 4 inches inside diameter, 4½ inches outside diameter, and a length somewhat in excess of the length of the induction heating coil, is placed within the coil and similar steel blanks processed therethrough, I find that 1500 pounds per hour of the same steel can be heated to a temperature of 1300 degrees with the same energy input previously required. Hence, with use of the tubular insert the operating efficiency of the unit is increased from approximately 48 percent to approximately 73 percent.

This efficiency may be further increased by reducing the wall thickness of the tubular insert. When the specific insert previously referred to was changed to ⅛ inch wall thickness instead of ¼ wall thickness, other conditions except energy input remaining the same, the overall efficiency of the unit was increased to approximately 82 percent. Hence, operating efficiency is increased as the wall thickness of the object-guiding insert is reduced, but the total absence of an insert reduces the efficiency to a very great extent.

Also, I find that in some instances it is preferable that one or both ends of insert 11 extend beyond the corresponding end of the induction heating coil. This requirement is determined on the following basis: (1) extension of insert 11 beyond either end of the induction heating unit is not required or particularly desirable if the metallic objects to be processed therein are non-magnetic in nature; (2) extension of insert 11 beyond at least one end and preferably both ends of the induction heating unit is desired if metallic objects of a magnetic nature are to be processed therethrough in a controllable manner by gravitational and magnetic forces alone, and; (3) extension of insert 11 beyond one and preferably both ends of the induction heating unit is desirable if the metallic objects to be processed therein are magnetic in nature even though a mechanical work-feeding device is used.

The operation of my improved method and apparatus may be shown by reference to Figs. 5 and 6, in which rivets 12 are heated. Fig. 5 shows an induction heating coil without an insert and Fig. 6 shows a coil with an insert. As illustrated, the typical unit is horizontal although the unit may be tilted a given amount in a given direction for purposes hereinafter explained.

In Figs. 5 and 6 an inclined conveyor member 13 feeds rivets 12a' and 12a'' into the entrance end of the induction heating unit. Said rivets are metallic and normally magnetic at room temperature. As rivet 12b' enters the heating coil of Fig. 5 it enters an alternating magnetic field and commences its heating cycle. Magnetic forces will draw rivet 12b' toward the center of the unit although in doing so rivet 12b' remains in close contact with liner or base sleeve 1 previously referred to. This causes additional frictional resistance to movement. As rivet 12b' travels toward the center of the unit it continues to experience a temperature rise.

However, as rivet 12c' approaches the center of the coil it encounters that portion of the magnetic field having the greatest intensity and rivets 12c' are caused to come in close contact with liner 1 at all circumferential portions thereof. Additionally, rivets 12c' tend to form in a cluster and when located at the center of the composite coil a sufficient length of time, eventually reach a temperature at which they lose their magnetic properties and tend to fall to the bottom portion of horizontal liner 1. However, clustering of rivets 12c' and the consequential "jamming" effect prevent forcing of heated rivets 12d' and 12e' out of the heating unit by magnetic forces acting on rivets 12b' and gravitational forces acting on rivets 12a'.

It is further observed that as soon as rivets 12d' reach the discharge end of the coil they encounter comparatively cold air currents and are cooled to a temperature below their Curie point. The regained magnetic properties coupled with the magnetic flux existing at the discharge end of the coil cause rivets 12e' to "hang" in mid-air. This condition causes further "jamming" within the coil. To correct the above described conditions it becomes necessary to resort to a mechanical workpiece feeding device.

However, if the object-guiding insert 11 of my invention is used, as illustrated in Fig. 6, the disadvantages described with reference to Fig. 5 are overcome. As above stated, rivets 12a'' are supplied to the heating unit from inclined conveyor member 13.

As rivet 12b'' enters object-guiding insert 11 it becomes heated by the transformation therein of energy from the alternating magnetic field. Magnetic forces draw rivets 12b'' toward the center portion of the unit although in doing so rivets 12b'' tend to "float" within insert 11. In turn, the effectiveness of gravitational forces acting on rivets 12a'' and magnetic forces acting on rivets 12b'' is increased. Rivets 12b'' undergo a continued temperature rise as they move toward the center of the unit and when reaching a position indicated by 12c'' they lose their magnetic properties.

The heated rivets 12d'' are moved along insert 11 toward its discharge end by the previously referred to gravitational and magnetic forces acting upon rivets 12a'' and 12b'' respectively. As they reach the end of the heating unit rivets 12e'' do not experience a regaining of magnetic properties until they have passed beyond the magnetic field of the coil. This is brought about by extending insert 11 beyond the coil to prevent surface cooling of the workpieces by cold air currents. Hence, magnetic forces do not retain workpieces within the discharge end of the coil when my invention is used.

Depending upon the length of the unit, size and weight of the metallic objects being heated therein, and intensity of the magnetic field, the unit may require tilting from the horizontal position shown in Fig. 6. Generally, if the workpiece being processed is comparatively heavy the discharge end of insert 11 must be lower than the entrance end in order that workpieces contained therein be moved therethrough in a controllable manner without the need of an auxiliary work-feeding apparatus. If the individual workpieces are comparatively light in weight and particularly if the heating unit has appreciable length it may become necessary to locate the discharge end of insert 11 above the entrance end: in so doing the excessive magnetic forces acting on workpieces located within the entrance half of the unit are opposed by increased unbalanced gravitational forces. I have found that by merely changing the angle or direction of incline of insert 11, I can very closely control the peak temperature of the metallic objects being discharged by the unit and use of a mechanical or electrical pushing device is totally eliminated.

Figs. 7 and 8 illustrate other modifications of my invention. Fig. 7 shows a nesting of a multiplicity of object-guiding inserts 11 within liner or base sleeve 1. This arrangement operates efficiently in the manner of the embodiment previously described. Here also, inserts 11 may or may not extend beyond one or both ends of the induction heating unit depending upon the conditions previously outlined.

Fig. 8 illustrates a type of induction heating unit in which the object-guiding insert 14 of my invention doubles as a structural liner or base sleeve for the coil. However, if it is desired to adapt a single-purpose unit of this construction to the processing of metallic objects having an appreciably smaller cross-sectional area than the cross-sectional area of insert 11 it becomes necessary to use an additional object-guiding insert 15 which must not have circumferential continuity. Such additional insert 15 may take the form depicted in Fig. 8 although other forms, such as a rectangular cross-sectional shape will suffice. However, insert 15 must have circumferential discontinuity throughout its length.

It can thus be seen that I have provided a method and apparatus for induction heating using low frequency electrical energy without the low efficiencies usually associated with such low frequency heating. In addition, I have provided an apparatus which may be easily and quickly adapted to the treatment of articles of different sizes without changing the basic induction heating unit. This flexibility can be accomplished with a minimum of cost. Furthermore, I have provided a method and apparatus whereby the articles may be moved through the induction heating equipment without the use of additional moving means.

What I claim is:

1. In an apparatus for heating metallic objects, the combination comprising an induction heating coil, a structural liner for said coil for supporting said coil, a tubular insert positioned within said coil, said insert having open ends and being circumferentially continuous, said insert being made of a metallic material and having an internal cross sectional configuration of similar size and shape as the cross sectional configuration of the metallic objects to be processed therein, the size and shape of the insert being slightly greater than the size and shape of the metallic object to permit expansion of the object as it is processed through the insert, one end of said insert extending beyond the end of said induction heating coil a distance sufficient to cause an increase in the total magnetic flux contained within said insert, whereby objects to be processed may be inserted in said extended end and immediately subjected to a magnetic flux.

2. In an apparatus for heating metallic objects, the combination comprising an induction heating coil, a structural liner for said coil for supporting said coil, a tubular insert positioned within said coil, said insert having open ends and being circumferentially continuous, said insert being made of a metallic material and having an internal cross sectional configuration of similar size and shape as the cross sectional configuration of the metallic objects to be processed therein, the size and shape of the insert being slightly greater than the size and shape of the metallic object to permit expansion of the object as it is processed through the insert, one end of the insert extending beyond the end of said induction heating coil a distance sufficient to prevent cooling of the metallic objects by contact with air when they are moved beyond the end of said coil by objects inserted in the other end of said insert.

3. In an apparatus for heating metallic objects, the combination comprising an induction heating coil, a structural liner for said coil for supporting said coil, a tubular insert positioned within said coil, said insert having open ends and being circumferentially continuous, said insert being made of a metallic material and having an internal cross sectional configuration of similar size and shape as the cross sectional configuration of the metallic objects to be processed therein, the size and shape of the insert being slightly greater than the size and shape of the metallic object to permit expansion of the object as it is processed through the insert, one end of said insert being elevated above the other end a distance sufficient to cause controlled movement of objects processed therein solely by the interacting forces of the magnetic flux and gravity on said objects.

4. In an apparatus for heating metallic objects, the combination comprising an induction heating coil, a structural liner for said coil for supporting said coil, a multiplicity of tubular inserts positioned within said coil, said inserts having open ends and being circumferentially continuous, said inserts being made of a metallic material and having an internal cross sectional configuration of similar size and shape as the cross sectional configuration of the metallic objects to be processed therein, the size and shape of the inserts being slightly greater than the size and shape of the metallic objects to permit expansion of the object as it is processed through an insert.

5. In an apparatus for heating metallic objects, the combination comprising an induction heating coil, a metallic liner supporting said coil, said liner being circumferentially continuous, a tubular insert positioned within said structural liner, said insert having the ends thereof open and being circumferentially discontinuous, said insert being made of a metallic material and having an internal cross sectional configuration similar in size and shape to the cross sectional configuration of the metallic objects to be processed therein, the size and shape of the insert being slightly greater than the size and shape of the metallic objects to permit expansion of the metallic objects as they are heated in being processed through the apparatus.

6. In an apparatus for heating metallic objects, the combination comprising an induction heating coil, a metallic liner supporting said coil, said liner being circumferentially continuous, a multiplicity of tubular inserts positioned within said structural liner, said inserts having the ends thereof open and being circumferentially discontinuous, said inserts being made of a metallic material and having an internal cross sectional configuration similar in size and shape to the cross sectional configuration of the metallic objects to be processed therein, the size and shape of the insert being slightly greater than the size and shape of the metallic objects to permit expansion of the metallic objects as they are heated in being processed through the apparatus.

7. In the method of heating metallic objects wherein the metallic objects are successively moved through an induction coil assembly having an induction coil and a structural liner, the improvement which comprises providing an independent, substantially tubular member within the structural liner and extending beyond the discharge end of the coil to surround the objects and prevent the immediate cooling of the objects by convective air currents after they have passed through the coil.

8. In an apparatus for heating metallic objects wherein the metallic objects are moved in succession through an induction coil assembly having an induction coil and a structural liner supporting said induction coil, the improvement which comprises a tubular member positioned within said structural liner and having the axis thereof generally parallel to the longitudinal axis of the structural liner, said tubular member having open ends through which the metallic objects may be moved from one end to the other for heating, said tubular member being circumferentially continuous and made of a metallic material.

9. In an apparatus for heating metallic objects wherein the metallic objects are moved in succession through an induction coil assembly having an induction coil and a generally tubular structural liner supporting said induction coil, the improvement which comprises a generally tubular member positioned within said structural liner and adapted to guide the metallic objects through the coil, said member being made of a metallic material and having a cross sectional size and shape similar to the cross sectional size and shape of the objects to be heated, the size and shape of the member being slightly greater than the size and shape of the metallic objects to permit expansion of the object as it is processed through the member.

10. In an apparatus for heating metallic objects wherein the metallic objects are moved in succession through an induction coil having a generally tubular structural liner supporting said induction coil, the improvement which comprises a generally tubular member positioned within said structural liner and adapted to guide the metallic objects through the coil, said member being made of a metallic material and having a cross sectional size and shape similar to the cross sectional size and shape of the objects to be heated, the size and shape of the member being slightly greater than the size and shape of the metallic objects to permit expansion of the object as it is processed through the member, said member having sufficient thickness and rigidity to support the weight of the objects to be processed therein.

11. The method of feeding and heating magnetic articles which comprises establishing a low frequency coil heating zone of predetermined length and of relatively greater length compared to diameter, said zone being more horizontal than vertical, defining a first passageway through said zone, defining one or more secondary passageways through said first passageway, the size of said one or more secondary passageways being slightly larger than the cross-sectional size of the articles to be fed therethrough, affecting the feeding of articles through said one or more secondary passageways by the magnetic forces of said low frequency coil heating zone up to a point where said articles moving through said zone are heated to a temperature at which they lose their magnetic properties, continuing to subject said articles to the action of said low frequency coil heating zone past said point at which the articles lose their magnetic properties to a point of discharge from said one or more secondary passageways.

12. The method of feeding and heating magnetic articles which comprises establishing a low frequency coil heating zone of predetermined length and of relatively greater length compared to diameter, said zone being more horizontal than vertical, defining a first passageway through said zone, defining one or more secondary passageways through said first passageway, the size of said one or more secondary passageways being slightly larger than the cross-sectional size of the articles to be fed therethrough, affecting the feeding of articles through said one or more secondary passageways by the magnetic forces of said low frequency coil heating zone up to a point where said articles moving through said zone are heated to a temperature at which they lose their magnetic properties, continuing to subject said articles to the action of said low frequency coil heating zone past said point at which the articles lose their magnetic properties to a point of discharge from said one or more secondary passageways, the effective length of feeding being greater than the effective length of heating.

13. In an apparatus for inductively heating metallic objects, the combination of an induction heating coil, a structural liner supporting said coil, and at least one metallic, generally tubular, object-guiding insert positioned within said structural liner, the interior cross-section of each object-guiding insert positioned within said structural liner being slightly larger than the cross-sectional size of the objects to be processed therethrough and sufficiently large to permit unrestrained expansion of said objects, and each said object-guiding insert being removable relative to said structural liner.

14. The apparatus set forth in claim 13 wherein the object-discharging end of each said object-guiding insert projects beyond the corresponding end of the induction heating coil a distance sufficient to prevent the magnetic flux issuing from said induction heating coil from retarding the free discharge of the metallic objects processed within said object-guiding insert.

15. The apparatus set forth in claim 14 wherein the object-receiving end of each object-guiding insert projects beyond the corresponding end of the induction heating coil a distance sufficient to cause an increase in the total magnetic flux contained within each said object-guiding insert.

16. The apparatus set forth in claim 14 wherein one end of each object-guiding insert is elevated above the other end of said object-guiding insert a distance sufficient to control movement of those metallic objects processed therein solely by interacting forces of magnetic flux and gravity.

17. The apparatus set forth in claim 13 wherein one of said structural liners or said object-guiding insert is peripherally continuous while the other is peripherally discontinuous.

18. In an apparatus for heating metallic objects, the combination comprising an induction heating coil, a structural liner for supporting said coil, a tubular metallic insert positioned within said coil, said insert having open ends and being circumferentially continuous, said insert being removable whereby said insert may be removed and replaced by an insert having a different cross sectional size and shape to thereby accommodate objects having a different cross sectional size and shape.

19. The method of heating metallic objects which comprises moving said objects in succession through an induction coil having a generally tubular structural liner, restraining the lateral movement of said objects during the movement through said induction coil, and controlling the inclination of the path of movement of said objects in such a manner that said objects are acted upon solely by magnetic and gravitational forces to cause the successive movement of the objects through the induction coil and the desired heating of the objects.

20. The method of heating magnetic articles which comprises positioning a low frequency coil with its axis being more horizontal than vertical, causing articles to move in succession through said low frequency coil solely under the influence of gravity and the magnetic force of said low frequency coil, said articles being magnetic as they enter the coil and being heated in the central portion of the coil to a point at which the temperature of said articles is such that said articles lose their magnetic properties and being cooled as they pass beyond the center of the coil thereby regaining their magnetic properties, continuing the lateral restraint to movement of said articles after they have passed through the coil, thereby nullifying the magnetic forces tending to pull said articles back toward said coil.

References Cited in the file of this patent

UNITED STATES PATENTS

| | | |
|---|---|---|
| 2,181,274 | Jackson et al. | Nov. 28, 1939 |
| 2,513,778 | Bailey | July 4, 1950 |
| 2,669,647 | Segsworth | Feb. 16, 1954 |
| 2,672,550 | Vaughan | Mar. 16, 1954 |
| 2,687,464 | Crawford | Aug. 24, 1954 |
| 2,759,087 | Lackner | Aug. 14, 1956 |